(12) United States Patent
Uematsu et al.

(10) Patent No.: US 6,436,168 B1
(45) Date of Patent: Aug. 20, 2002

(54) TREATMENT PROCESS FOR RESINS OR ORGANIC COMPOUNDS, OR WASTE PLASTICS CONTAINING THEM

(75) Inventors: Hiroshi Uematsu; Hirotoshi Kondo; Nobuhiko Takamatsu, all of Tokyo; Seiji Nomura; Kenji Kato, both of Futtsu, all of (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 09/530,330

(22) PCT Filed: Aug. 27, 1999

(86) PCT No.: PCT/JP99/04654

§ 371 (c)(1),
(2), (4) Date: Apr. 27, 2000

(87) PCT Pub. No.: WO00/12599

PCT Pub. Date: Mar. 9, 2000

(30) Foreign Application Priority Data

Aug. 28, 1998 (JP) ............................................. 10-244069
May 13, 1999 (JP) ............................................. 11-132091

(51) Int. Cl.⁷ ................................................. C21B 5/00
(52) U.S. Cl. ......................................................... 75/471
(58) Field of Search ........................................... 75/471

(56) References Cited

U.S. PATENT DOCUMENTS

| | | | | |
|---|---|---|---|---|
| 4,419,334 A | * | 12/1983 | Karger | 423/240 R |
| 5,992,335 A | * | 11/1999 | Nakamura et al. | 75/459 |
| 6,048,380 A | * | 4/2000 | Asanuma et al. | 75/414 |
| 6,230,634 B1 | * | 5/2001 | Okochi et al. | 75/471 |
| 6,329,496 B1 | * | 12/2001 | Komaki et al. | 528/480 |

FOREIGN PATENT DOCUMENTS

| | | |
|---|---|---|
| JP | 48-34901 | 5/1973 |
| JP | 49-10321 | 3/1974 |
| JP | 51-33493 | 9/1976 |
| JP | 59-120682 | 7/1984 |
| JP | 4-041588 | 2/1992 |
| JP | 6-228565 | 8/1994 |
| JP | 7-216361 | 8/1995 |
| JP | 8-120285 | 5/1996 |
| JP | 8-157834 | 6/1996 |
| JP | 8-507105 | 7/1996 |
| JP | 8-259955 | 10/1996 |
| JP | 9-125113 | 5/1997 |
| JP | 9-132782 | 5/1997 |
| JP | 9-137926 | 5/1997 |
| JP | 9-157834 | 6/1997 |
| JP | 9-170009 | 6/1997 |
| JP | 9-178130 | 7/1997 |
| JP | 9-202907 | 8/1997 |
| JP | 2765535 | 4/1998 |
| JP | 10-225676 | 8/1998 |
| JP | 10225676 A | * 8/1998 |
| JP | 10-225930 | 9/1998 |
| JP | 10-245606 | 9/1998 |

\* cited by examiner

*Primary Examiner*—Melvyn Andrews
(74) *Attorney, Agent, or Firm*—Kenyon & Kenyon

(57) ABSTRACT

A treatment process for resins or organic compounds, or waste plastics containing them, whereby a portion of the resins or organic compounds, or waste plastics containing them are subjected to combustion treatment in a blast furnace while the remainder is subjected to thermal decomposition treatment in a coke oven.

10 Claims, 4 Drawing Sheets

TREATMENT PROCESS FOR RESINS OR ORGANIC COMPOUNDS, OR WASTE PLASTICS CONTAINING THEM

TECHNICAL FIELD

Resins such as polypropylene, polyethylene, polyvinyl chloride, polystyrene, polyvinylidene chloride and the like and organic compounds such as polychlorinated biphenyl are disposed of in large amounts each year as industrial waste products or as general waste products collected from households. These resins or organic compounds, or waste plastics containing them, will hereunder be referred to by the general term "waste plastics". Waste plastic disposal reaches an amount of about 4 million tons per year as industrial waste products and about 4 million tons per year as general waste products.

The present invention relates to a recycling treatment process for waste plastics.

BACKGROUND ART

The majority of conventional processes for recycling treatment of waste plastics involve combustion incineration and land-fill disposal. Combustion disposal results in damage to incinerators due to the large heat release, while chlorine-containing waste plastics present the problem of dealing with chlorine in the exhaust gas. waste plastics are not decomposed by microbes or bacteria in the soil, and this has led to a lack of land-fill sites and an increasing environmental burden. In consideration of the environment, it has been attempted to employ recycling techniques involving no incineration or land-fill disposal. Current recycling methods that avoid incineration include reuse as plastic raw materials and reuse of gas components obtained by thermal decomposition as fuel or chemical raw materials.

Among such methods of reuse of gas components obtained by thermal decomposition as fuel or chemical raw materials there is already known a method that utilizes waste plastics as reducing agents in blast furnaces and as part of a steel production process (Japanese Examined Patent Publication SHO No. 51-33493) and, recently, a variety of means have been developed for more efficiently realizing this purpose. (See, for example, Japanese Unexamined Patent Publication HEI No. 9-170009, No. 9-137926, No. 9-178130, No. 9-202907, Japanese Patent No. 2765535.)

For disposal of waste plastics in blast furnaces, it is necessary to consider the reduced blast furnace productivity due to blowing in of large amounts of waste plastics, and the chlorine that is inevitably included in the waste plastics.

Specifically, when waste plastics are loaded into a blast furnace at over 10 kg per ton of hot metal produced, there is a notable loss in productivity of the pig-iron as the blast furnace core tends to be inactivated. A conventional measure has been to set a limit of 10 kg per ton of hot metal in blast furnaces. Polyvinyl chloride, polyvinylidene chloride and polychlorinated biphenyl all contain chlorine, and on average chlorine is included in industrial waste plastics at about a few dozen wt % and in general waste plastics at about a few dozen wt %; both industrial waste plastics and general waste plastics still include chlorine at an average of a few wt % even after having undergone separation treatment. When such waste plastics are loaded directly into a blast furnace, the chlorine components of the waste plastics are converted to chlorine-based gases such as chlorine and hydrogen chloride by thermal decomposition, thus causing such problems as corrosion of the blast furnace body shell, corrosion of the stave cooler for cooling of the blast furnace, corrosion of the top exhaust gas apparatus of the blast furnace and corrosion of the generating equipment of the blast furnace. Consequently, chlorine-containing waste plastics have been removed beforehand or the chlorine components removed from the waste plastics before loading into blast furnaces.

A method of thermal decomposition treatment of waste plastics in coke ovens has long been known as part of steel production processes (Japanese Examined Patent Publication SHO No. 49-10321, Japanese Unexamined Patent Publication SHO No. 59-120682), and recently a variety of means have been developed for more efficiently accomplishing treatment of waste plastics, such as loading methods that take into consideration coke strength. (See, for example, Japanese Unexamined Patent Publication HEI No. 8-157834). Coke ovens are facilities for dry distillation of coal, and they also serve as recycling plants that can dry distill waste plastics to obtain fuel gas, tar and coke.

As with treatment in blast furnaces, when waste plastics are processed in coke ovens it has also been necessary to consider the reduced coke oven productivity due to the waste plastics, and the chlorine that is inevitably included in the waste plastics.

When loaded into a coke oven in admixture with coal, under current circumstances the coke quality is drastically reduced with loading of over 10 kg per ton of coal. Consequently, while it should be theoretically possible to process 10 kg per ton of coal in a coke oven, when waste plastics that inevitably include chlorine at about 3–5 wt % are directly loaded into a coke oven the chlorine may remain in the coke, leading not only to concerns of corrosion of exhaust gas lines by chlorine-based gases produced by thermal decomposition but also to concerns of inclusion of chlorine-based gas in the tar and coke oven gas by-products; for loading into coke ovens, therefore, it is usually necessary to first remove the chlorine components by thermal decomposition before loading, as described in Japanese Unexamined Patent Publication HEI No. 7-216361, or to first remove the chlorine-based resins by gravity separation or the like before loading of waste plastics into the coke oven, as described in Japanese Unexamined Patent Publication HEI No. 8-259955, for which reasons treatment in coke ovens has not been attempted in practice.

In methods where waste plastics are used as reducing agents in blast furnaces as part of the steel production process, there is a limit to the amount of waste plastics that can be blown into a blast furnace through the tuyere, and in consideration of reduced blast furnace productivity, since the mean productivity is about 2 t/d/m$^3$ even in a large-sized blast furnace with a volume of 4000 m$^3$, it is not possible to process more than 30,000 tons of waste plastics per year even with maximum blowing into the blast furnace, and this makes it impossible to meet social demands for recycling of the large volumes of waste plastics that are disposed of each year. Furthermore, prior removal of chlorine-containing waste plastics or removal of the chlorine components in the waste plastics has complicated the procedure, leading to increased treatment costs. Waste plastics collected in cities usually contain about 3–5 wt % of chlorine components after pre-treatment by magnetic separation, aluminum separation, and the like. This is largely due to the 6–10 wt % of polyvinyl chloride contained in the waste plastics. Corrosion of blast furnaces by chlorine-based gas will generally occur unless the chlorine content is reduced to under 0.5 wt %. Methods are therefore employed to remove the chlorine components beforehand as chlorine-based gas by heating at about 300° C., or to separate the lightweight plastics from the heavyweight plastics by gravity separation using a centrifugal separator, for example, and loading only the lightweight plastics with low chlorine contents into the blast furnace. However, this has not been employed to any great extent because of the extremely high cost of dechlorinating all collected waste plastics with dechlorination apparatuses and the technical difficulty of dechlorination from 3–5 wt % to 0.5 wt %. Instead, it has become common to employ the method of separating lightweight plastics from heavyweight plastics by gravity separation using a centrifugal separator, for example, and loading only the lightweight plastics with low chlorine contents into the blast furnace. Nevertheless, this method has also presented some problems. These will be explained using a centrifugal separator as an example. It is impossible to achieve ideal separation of 100 kg of foreign matter-removed waste plastics (containing 10 kg of vinyl chloride and 5 kg of chlorine by weight) with a centrifugal separator, i.e., to obtain 90 kg of matter with a 0% chlorine content as the lightweight portion and 10 kg of matter with a 50% chlorine content as the heavyweight portion (the chlorine content of polyvinyl chloride is approximately 57 wt %). At the current time, it is only possible to obtain 50 kg of matter with a chlorine content of 0.5% as the lightweight portion and 50 kg of matter with a chlorine content of 9.5% as the heavyweight portion or, even under the most ideal conditions, to separate 70 kg of matter with a chlorine content of 0.5% as the lightweight portion and 30 kg of matter with a chlorine content of 15.5% as the heavyweight portion. In this case, the waste plastics containing chlorine at 9.5–15.5 wt % cannot be further dechlorinated to a chlorine content of 0.5 wt % or lower, and the separated heavyweight waste plastics (corresponding to 30–50% of the waste plastics before separation) are treated as residue and have had to be disposed of by land-fill, for example. Treatment as residue not only incurs treatment costs of about 30,000 yen per ton of residue but also highlights the low recycling efficiency of waste plastics, such that this recycling method fails to meet the social demands for recycling.

As mentioned above, the method of utilizing waste plastics in coke ovens as a part of the steel production process is recognized as requiring removal of chlorine components by thermal decomposition prior to loading or removal of chlorine-based resins by gravity separation or the like before loading of waste plastics into the coke oven, and therefore treatment in coke ovens has not been carried out in a practical manner. As explained above, prior removal of chlorine components is a problem for waste plastic recycling in blast furnaces because of the high cost of dechlorination, the high cost of heavyweight waste plastic treatment and the low recycling efficiency, which are problems that have prevented application of this method.

Even with removal of the chlorine components before loading and loading of the maximum possible amount of waste plastics in a coke oven with 100 chambers, it is possible to process no more than 10,000 tons per year, which is a volume that cannot meet the social demands of recycling of waste plastics that are disposed of in large amounts each year.

DISCLOSURE OF THE INVENTION

The present invention provides a means of solving these problems of the prior art and, specifically, it not only provides a method of recycling waste plastics as gas, tar and coke by increasing the waste plastic treatment capacity of conventional blast furnaces in terms of treatment capacity in the ironmaking step of steel production without investment of expensive equipment for the ironmaking step, but also provides a treatment process that can achieve greater recycling efficiency for waste plastics by reducing or eliminating the burden of the prior dechlorination step which has been indispensable according to the prior art. The gist of this method is based on a process that involves loading waste plastics into a thermal decomposition furnace without prior removal of the chlorine components and contacting the thermally decomposed gas containing chlorine-based gas with ammonia water, in combination with waste plastic treatment in a blast furnace. A coke oven may be conveniently employed as the thermal decomposition furnace since the ammonia water produced from coal can be utilized. However, the present invention is not limited to coke ovens and can be carried out with any thermal decomposition furnace, ammonia source and blast furnace. The present inventors have discovered the following three embodiments in which a coke oven is used as the thermal decomposition furnace.

The first embodiment is a method whereby waste plastics containing chlorine components are separated into high level and low level component portions by gravity separation, for example, and the high level of chlorine component portion is loaded into a coke oven for thermal decomposition treatment while the low level of chlorine component waste plastics are loaded into a blast furnace for thermal decomposition treatment (FIG. 3A).

The second embodiment is a method whereby a portion of waste plastics is subjected to prior dechlorination treatment before loading into a blast furnace and a portion or all of the remainder is loaded into a coke oven without prior dechlorination treatment (FIG. 3B).

The third embodiment is a method whereby waste plastics, without prior removal of the chlorine components, are loaded into a blast furnace in an acceptable chlorine concentration range for treatment, and a portion or all of the remainder is loaded into a coke oven for treatment, also without prior removal of the chlorine components (FIG. 3C).

BRIEF DESCRIPTION OF THE DRAWINGS

In FIG. 1, 1 is a waste plastic sorting apparatus, 2 is a coke oven, 3 is a blast furnace, 4 is a volume of waste plastics containing vinyl chloride, 5 is a volume of waste plastics containing a large amount of vinyl chloride, 6 is a volume of waste plastics containing a small amount of vinyl chloride, 7 is coke oven gas, 8 is coke, 9 is blast furnace gas and 10 is hot metal.

MODES FOR CARRYING OUT THE INVENTION

The present inventors first discovered that a process of contacting ammonia water with the chlorine-based gas generated during thermal decomposition of waste plastics in a thermal decomposition furnace is very economical. It was also found that a coke oven in an ironmaking step for steel production may be employed as the thermal decomposition furnace, in which case there is no need to separate the chlorine components from the waste plastics beforehand. It was further found that combining a blast furnace with a coke oven allows treatment of waste plastics to be achieved in the blast furnace without prior dechlorination treatment (FIG.

Figure 3A:
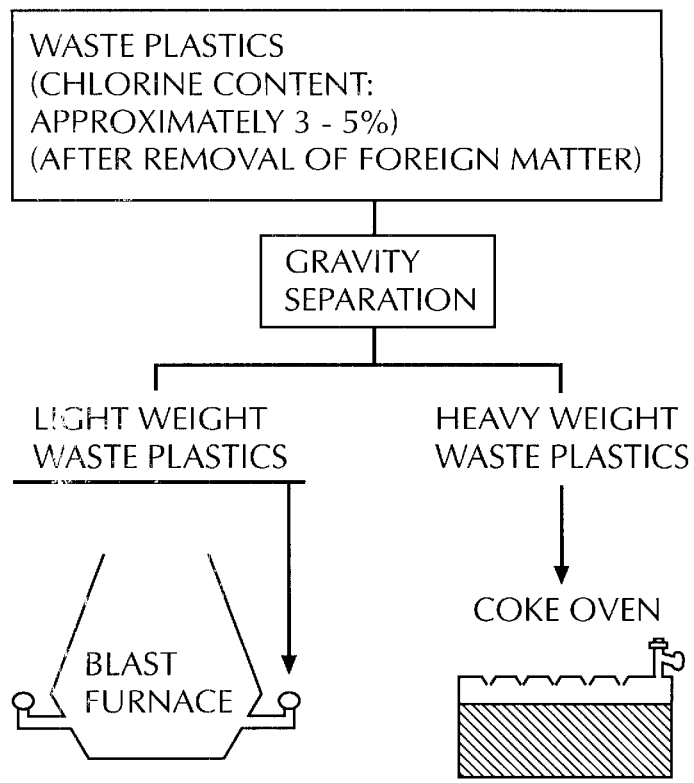
FIGS. 3A–3C are illustrations showing embodiments of concrete treatment according to the invention.
Figure 3B:
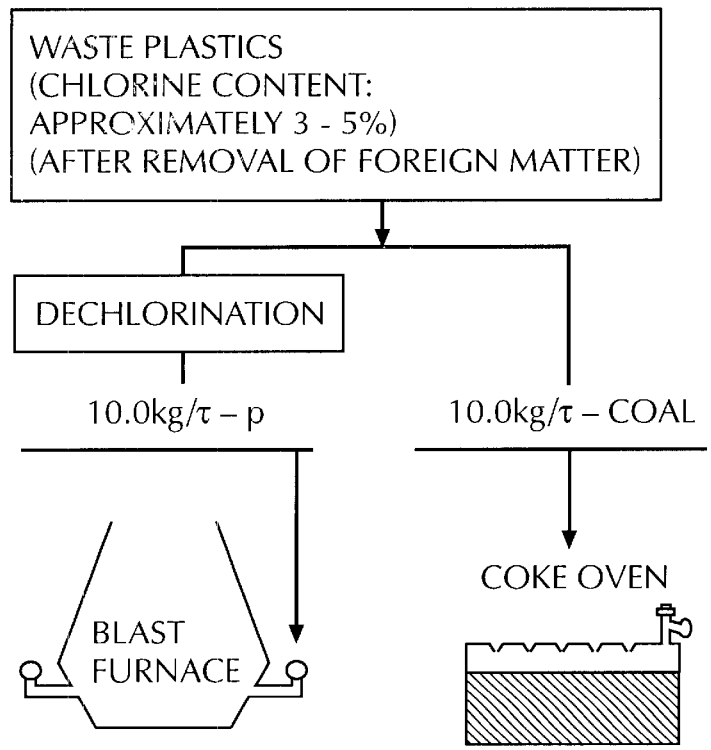
Figure 3C:
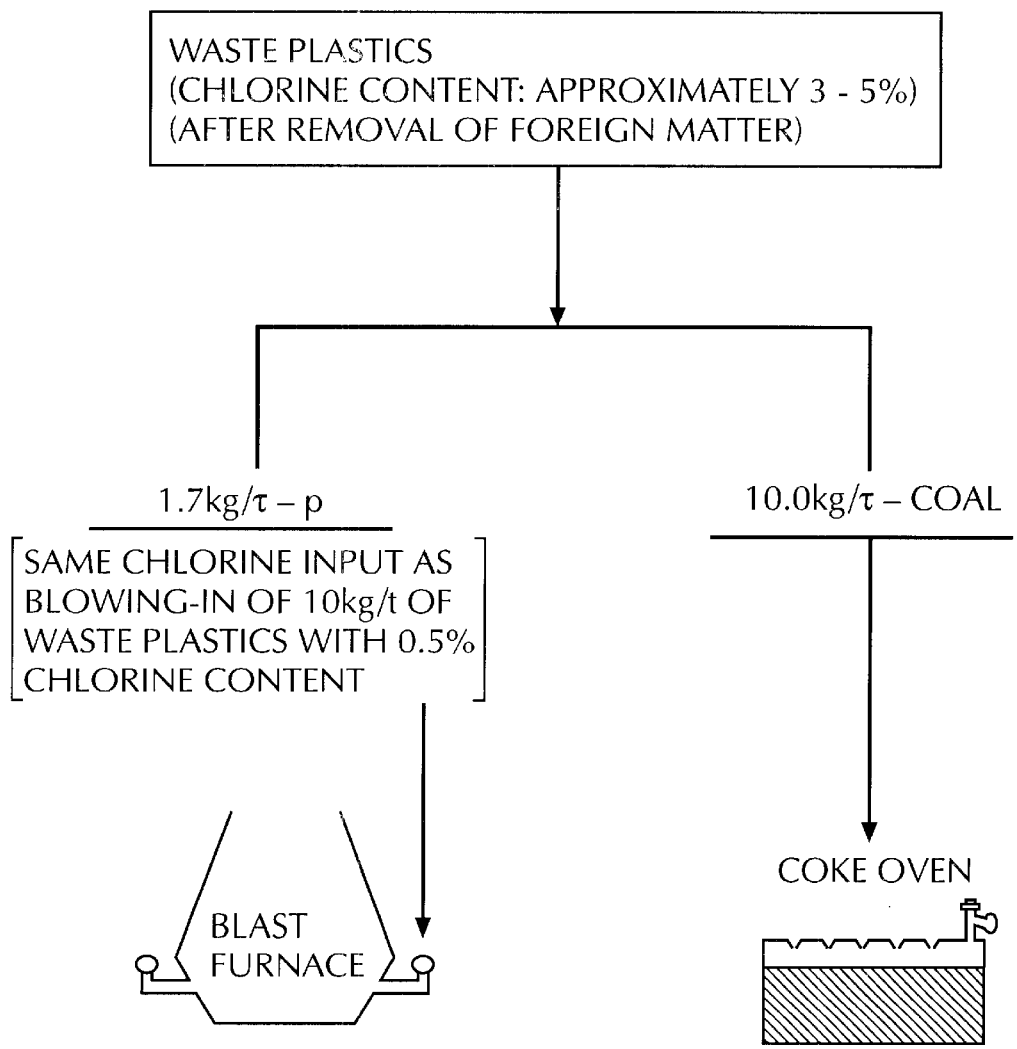

3A), allows savings in the total dechlorination costs (FIG. 3B) or reduces the problem of corrosion by chlorine in the blast furnace (FIG. 3C).

First, the present inventors diligently investigated dry distillation of chlorine component-containing waste plastics in coke ovens. For dry distillation of coal in the carbonization chamber of a coke oven, the generated coke oven gas includes water and ammonia in addition to its tar components, and after the coke oven gas has been discharged from the coke oven it is cooled by flushing with ammonia liquor (retaining and circulating coal-derived ammonia water); it is then separated into tar and coke oven gas as fuel gas, while the water and ammonia in the coke oven gas are converted to ammonia liquor and used for circulation. The present inventors therefore considered that in the case of a coke oven, the presence of ammonia in the coke oven gas would allow any chlorine-containing gas produced by thermal decomposition to be converted to harmless ammonium chloride, and hence carried out the following detailed investigation.

The chlorine components in resin or organic matter decompose at 250–1300° C. during dry distillation in the carbonization chamber of a coke oven, but they may still remain in the coke as inorganic matter. However, it has been confirmed that when chlorine-containing plastics are dry distilled together with coal, over 90% of the chlorine components migrate to the vapor phase while no more than 10% remains in the coal as residue.

When chlorine-based gas is resident in the carbonization chamber it can leak out during discharging the coke cake, but it has been confirmed that the chlorine-based gas that has migrated to the vapor phase rises in the carbonization chamber of the coke oven, reaching the top space above the coal that has been loaded and undergoing dry distillation in the 1100° C. atmosphere during discharging coke cake, so that virtually none remains in the oven.

The chlorine-based gas generated by thermal decomposition of chlorine-containing plastics is a corrosive gas, and if it is directly discharged through the discharging system as hydrogen chloride, for example, this raises a concern of corrosion of the discharging system pipes; however, diligent research by the present inventors has demonstrated, surprisingly, that when the gas that is a mixture of chlorine-based gas and ammonia-containing coke oven gas is directed to a bend through the ascension pipe of the coke oven and cooled to about 80° C. by flushing with cooling water (ammonia liquor), most of the chlorine-based gas included in this gas is captured so that the flushed coke oven gas contains virtually no chlorine.

This occurs because the coal-derived ammonia and chlorine-based gas dissolve in the ammonia liquor in the form of ammonium chloride due to the flushing, and are thus separated from the coke oven gas.

Although the ammonia liquor contains tar, this is separated by decantation, and the ammonia liquor from which the tar component has been separated and removed is usually stored temporarily in an ammonia liquor tank and discharged out of the system at about 100–200 kg of ammonia liquor per ton of coke, while the rest is reused for flushing. Repetition of this procedure will accumulate ammonium chloride in the ammonia liquor, leading to a concern since the solubility will be exceeded at some point. The ammonia liquor used for the flushing contains residual ammonium chloride captured by the previous flushing, but the moisture released from the coal by carbonization of the coal is as much as 100–200 kg (about 5500–11,000 mol) per ton of coke. This is because the coal originally contains about 9% moisture, while the moisture is increased by another 3% due to other reactions. For example, assuming that 160 kg of water is released in the course of producing one ton of coke and given that the solubility of ammonium chloride is "37.2 g/100 g of water at 20° C.", calculation from the atomic weight of ammonium chloride, 53.4, gives a permissible limit of about 1100 mol (=160,000×0.372/53.4) ammonium chloride per ton of coke. when 10 kg of chlorine-containing plastics is added to one ton of coal, which corresponds to 1% of the amount of coal, even if half of the weight is polyvinyl chloride, the chlorine generated is about 80 moles (80 mol in terms of HCl, 40 mol in terms of $Cl_2$), and the moisture generated when the coal has been dry distilled is a sufficient amount to allow the chlorine generated from the chlorine-containing plastic to dissolve into the water as ammonium chloride. Consequently, there is no risk of saturation of the flushing ammonia liquor with ammonium chloride.

Thus, the present inventors first carefully studied dry distillation of chlorine-containing waste plastics in coke ovens, and found that (1) even when resins or organic compounds containing chlorine are dry distilled with coal in a coke oven there is virtually no residue thereof in the coke, (2) when the dry distillation is carried out at 250–1300° C. the chlorine migrates to the vapor phase, (3) most of the chlorine that has migrated to the vapor phase is captured in the ammonia liquor as ammonium chloride during the ammonia liquor flushing, and (4) even when the ammonia liquor is circulated, the increased water generated during the coal dry distillation prevents saturation of the flushing ammonia liquor with ammonium chloride; as a result, it was found that even without prior removal of the chlorine components of chlorine-containing waste plastics, the chlorine-containing gas generated during the thermal decomposition process can be rendered harmless without requiring any special treatment steps in coke ovens that are used in the ironmaking step of steel production.

The inventors then focused on a treatment process allowing improved recycling efficiency by augmenting the waste plastic treatment volume in steel production processes and reducing or eliminating the burden of prior dechlorination steps for waste plastics that have been essential according to the prior art. This is highly significant as it corresponds to a wider range of waste plastic types that can be used for iron manufacturing and better production stability for iron manufacturing.

With ordinary operation in a blast furnaces, about 300 g of chlorine is included per ton of hot metal in the raw materials, i.e. the sintered minerals, coke and the pulverized coal injected from the tuyere; however, if this volume is drastically increased it will cause problems such as corrosion of the blast furnace body shell, the stave cooler, the top exhaust gas channel and the generating equipment of the blast furnace. When the waste plastics are blown in through the tuyere at 10 kg per ton of hot metal, the problems of corrosion become significant unless the chlorine content is reduced to under 0.5%.

The present inventors then found that by combining presorting waste plastics according to chlorine content, treatment in a coke oven for which prior dechlorination was found to be unnecessary, and treatment in a blast furnace that has chlorine input restrictions, it is possible not only to increase the waste plastic treatment volume in steel production processes but also to eliminate the prior dechlorination step for waste plastics that has been essential with the prior art, and that high chlorine-containing waste plastics that have hitherto been sent to land-fill sites can thus be recycled at a higher recycling efficiency.

In other words, by sorting collected waste plastics into high chlorine content and low chlorine content portions, recycling the low content portion, preferably having a chlorine content of less than 0.5%, as a reducing agent in a blast furnace and subjecting the high chlorine content portion to dry distillation treatment in a coke oven without prior removal of the chlorine components, it is possible to eliminate the very costly dechlorination step, alleviate the chlorine burden on the blast furnace, augment the treatment capacity and improve the recycling efficiency. According to the invention discovered by the present inventors, a method for recycling treatment is provided that is highly economical and practical in cases of collected waste plastics with very high expected chlorine contents.

The present inventors further found that, by combining treatment in a coke oven for which prior dechlorination was found to be unnecessary with treatment in a blast furnace that has chlorine input restrictions, it is possible to increase the waste plastic treatment volume in steel production processes. That is, by treating a treatable volume in a blast furnace and treating the remainder in a coke oven depending on the collecting conditions, or by treating a treatable volume in a coke oven and treating the remainder in a blast furnace depending on the collecting conditions, it is not only possible to increase the recycling treatment volume and recycling efficiency for waste plastics, but also when the production in either a blast furnace or a coke oven is not stable, the waste plastic treatment volume in the furnace or oven with unstable production may be reduced and the recycling treatment volume of the other increased, to thus contribute to greater production stability Employment of this method will be explained using as an example a blast furnace that produces 3 million tons of hot metal per year (approximately 4000 m$^3$, productivity: approximately 2 t/d/m$^3$). Here, the required coke is about 1.2 million tons, and considering the quality of the coke, it is possible to treat 12,000 tons of waste plastics assuming that 10 kg of waste plastic is treated per ton of coke. By additional treatment of 10 kg of waste plastic per ton of hot metal in the blast furnace, the maximum treatable volume is a total of 42,000 tons, so that a drastic increase in treatment volume can be achieved.

In addition, as a result of investigating the permissible conditions for chlorine in blast furnaces, the present inventors have discovered a treatment process that can accomplish larger treatment volumes in iron manufacturing processes, without prior removal of the chlorine components in the collected waste plastics and without employing a step of sorting the plastics according to chlorine content, such as by gravity separation or the like.

Waste plastics separated and collected from households have a chlorine content of 5–10 wt % in terms of chlorine. Even after air classification to remove other substances after collection, the chlorine content is still about 3%. Conventionally, in consideration of corrosion of the blast furnace when 10 kg of waste plastics are blown in through the tuyere per ton of hot metal, it has been necessary to carry out prior dechlorination treatment to reduce the chlorine content to about 0.5 wt %. Research by the present inventors has revealed, however, that the problem of blast furnace corrosion is not a problem of the chlorine content of the waste plastics treated in the blast furnace but rather a problem of the total chlorine input per ton of hot metal. It was found that with normal operation in a blast furnace, about 300 g of chlorine is included per ton of hot metal in the raw materials, i.e. the sintered minerals, coke and the pulverized coal injected from the tuyere, but that the problem of corrosion becomes notable when it exceeds about 350 g per ton of hot metal. Thus, it was found that while the chlorine content must be reduced to 0.5% by prior dechlorination when 10 kg is blown in from the tuyere per ton of hot metal, prior dechlorination of waste plastics with a chlorine content of about 3 wt % is not necessary if no more than 1.7 kg of waste plastics per ton of hot metal is loaded and treated in the blast furnace. This means that it is possible to save the amount of 1 to 2 billion yen as the prior dechlorination equipment investment required for prior dechlorination of about 30,000 tons of waste plastics, thus providing a substantial economic benefit.

However, while this method allows dechlorination to be eliminated, the limit of a maximum of 5000 tons that can be treated per blast furnace per year is not a sufficient treatment volume to treat the 1500 tons of waste plastics produced per year per 100,000 person population.

Here, the present inventors have discovered a treatment process wherein a maximum limit is placed on the blast furnace loading volume when no prior dechlorination treatment is carried out, and this is combined with treatment in a coke oven for which prior dechlorination treatment was found to be unnecessary, whereby it is possible to eliminate the prior dechlorination step that has been required for waste plastics according to the prior art, and to increase treatment volumes in the iron manufacturing process without employing a step of separating the plastics according to chlorine content by gravity separation or the like.

Considering the coke quality, the current limit for treatment of waste plastics is 10 kg per ton of coke. In this case, approximately 1.2 million tons of coke are necessary with a blast furnace to produce 3 million tons of hot metal per year, and therefore 12,000 tons of waste plastics can be treated. with an additional 5000 tons as the amount that can be treated with a blast furnace that produces 3 million tons of hot metal per year (approximately 4000 m$^3$ productivity; approximately 2 t/d/m$^3$), a total of up to 17,000 tons of waste plastics can be recycled.

The present inventors have accomplished the present invention on the basis of the above-mentioned research. The gist of the invention is the following.

(1) A treatment process for resins or organic compounds, or waste plastics containing them, characterized by treating a portion of resins or organic compounds, or waste plastics containing them in a blast furnace as reducing agents, subjecting all or a portion of the remainder to thermal decomposition treatment and contacting the gas generated by the thermal decomposition treatment with ammonia water;

(2) A treatment process for resins or organic compounds, or waste plastics containing them according to (1), characterized in that the ammonia water is generated during dry distillation of coal;

(3) A treatment process for resins or organic compounds, or waste plastics containing them, characterized by treating a portion of resins or organic compounds, or waste plastics containing them, in a blast furnace as reducing agents, and subjecting all or a portion of the remainder to thermal decomposition treatment in a coke oven;

(4) A treatment process for resins or organic compounds, or waste plastics containing them, characterized by separating resins or organic compounds, or waste plastics containing them, into a high chlorine content portion and a low chlorine content portion, treating the low chlorine content portion in a blast furnace and subjecting the high chlorine content portion to thermal decomposition treatment in a coke oven;

(5) A treatment process for resins or organic compounds, or waste plastics containing them according to (4), characterized by separating resins or organic compounds, or waste plastics containing them into a high chlorine content portion and a low chlorine content portion by gravity separation;

(6) A treatment process for resins or organic compounds, or waste plastics containing them, characterized by separating resins or organic compounds, or waste plastics containing them into a portion with an average chlorine content of 0.5 wt % or greater and a portion with an average chlorine content of less than 0.5 wt %, treating the portion with an average chlorine content of less than 0.5 wt % in a blast furnace and subjecting the portion with an average chlorine content of 0.5 wt % or greater to thermal decomposition treatment in a coke oven;

(7) A treatment process for resins or organic compounds, or waste plastics containing them, characterized by treating a portion of resins or organic compounds, or waste plastics containing them in a blast furnace as reducing agents after prior dechlorination treatment, and subjecting all or a portion of the remainder to thermal decomposition treatment in a coke oven without prior dechlorination treatment;

(8) A treatment process for resins or organic compounds, or waste plastics containing them according to (7), characterized by treating a portion of resins or organic compounds, or waste plastics containing them in a blast furnace as reducing agents after prior dechlorination treatment to a chlorine content of less than 0.5 wt %;

(9) A treatment process for resins or organic compounds, or waste plastics containing them according to (8), characterized in that the portion of resins, organic compounds or waste plastics containing them that has been subjected to prior dechlorination treatment to a chlorine content of less than 0.5 wt % is treated in the blast furnace in an amount of 0.5–10 kg per ton of hot metal;

(10) A treatment process for resins or organic compounds, or waste plastics containing them, characterized by treating a portion of resins or organic compounds, or waste plastics containing them, in a blast furnace as reducing agents without prior removal of the chlorine components, and subjecting all or a portion of the remainder to thermal decomposition treatment in a coke oven without prior removal of the chlorine components;

(11) A treatment process for resins or organic compounds, or waste plastics containing them according to (10), characterized in that the resins, organic compounds or waste plastics containing them, are treated in the blast furnace as reducing agents without prior removal of the chlorine components, at a minimum of 0.5 kg per ton of hot metal and a maximum of the blast furnace treatment volume that reflects the chlorine allowable limit;

(12) A treatment process for resins or organic compounds, or waste plastics containing them according to (11), characterized in that at least 0.5 kg and no more than 1.7 kg of the resins or organic compounds, or waste plastics containing them, is treated in the blast furnace per ton of hot metal without prior removal of the chlorine components.

According to the invention, an effect is provided whereby even in cases of unstable production at recycling plants for given amounts of collected waste plastics, it is possible to accomplish recycling in a separate system and thus achieve stabilized treatment.

According to the invention it is also possible to accomplish treatment without reduced recycling efficiency even when the chlorine content of the collected waste plastics varies. That is, it is possible to recycle chlorine-containing heavy waste plastics that for the most part have hitherto been handled as residue for land-fill disposal.

A drastic improvement in recycling efficiency and recycling volume can also be achieved compared to the conventional recycling treatment of waste plastics in blast furnaces alone during iron manufacturing processes.

It is possible to accomplish material recycling of hitherto non-recyclable waste plastics by using them as reducing agents or as tar, gas and the like. The majority of waste plastics thermally decomposed in the coke oven are converted to high-calorie reducing decomposition gases such as methane, ethane and propane and are included in the coke oven gas and collected for reuse as an energy source. The remaining carbon components are reused in the blast furnace as a portion of the coke. An overview of recycling according to the present invention is illustrated in FIG. 2.

Figure 1:
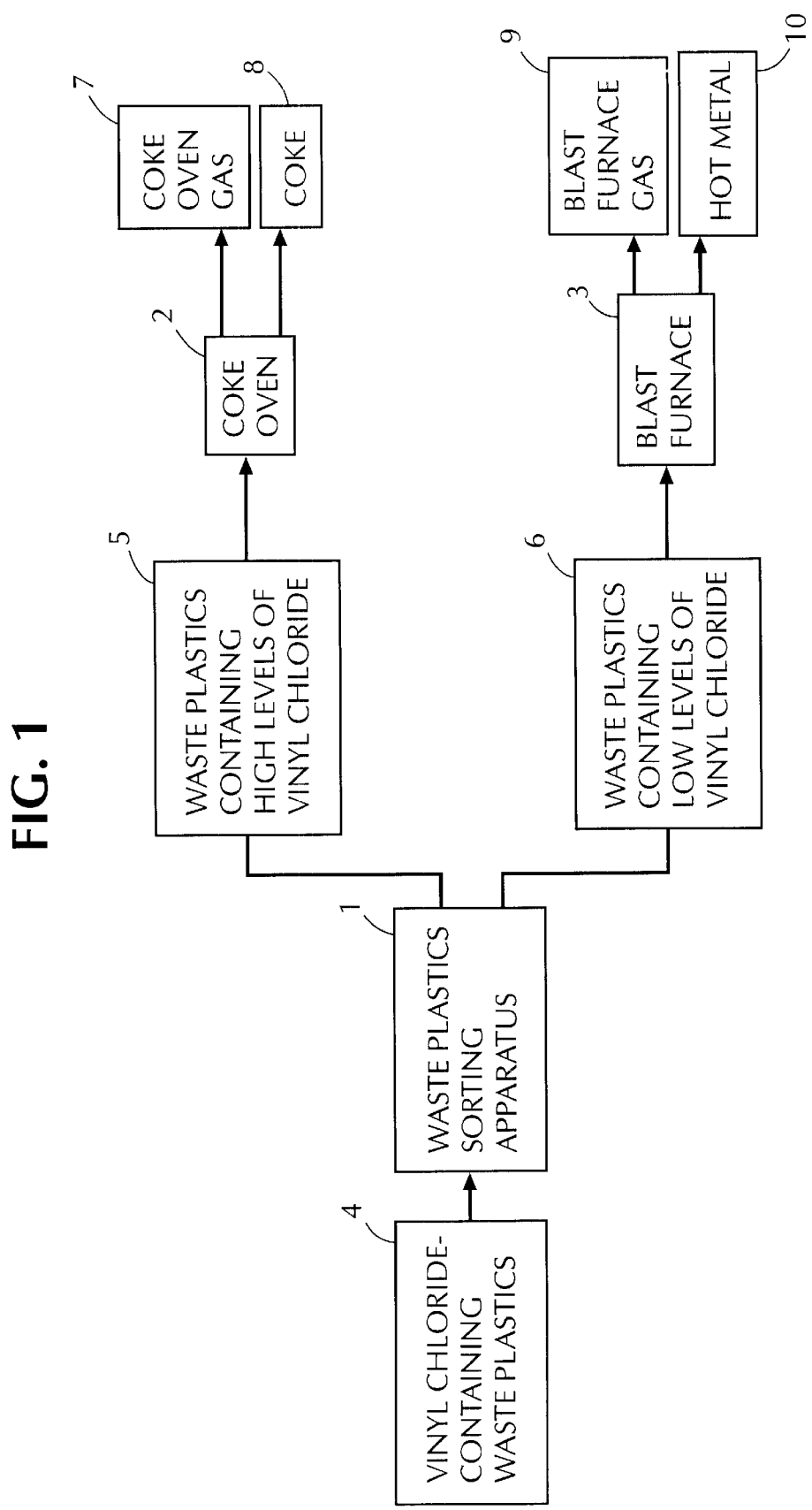
FIG. 1 is a flow chart for a waste plastic treatment process according to the invention.
Figure 2:
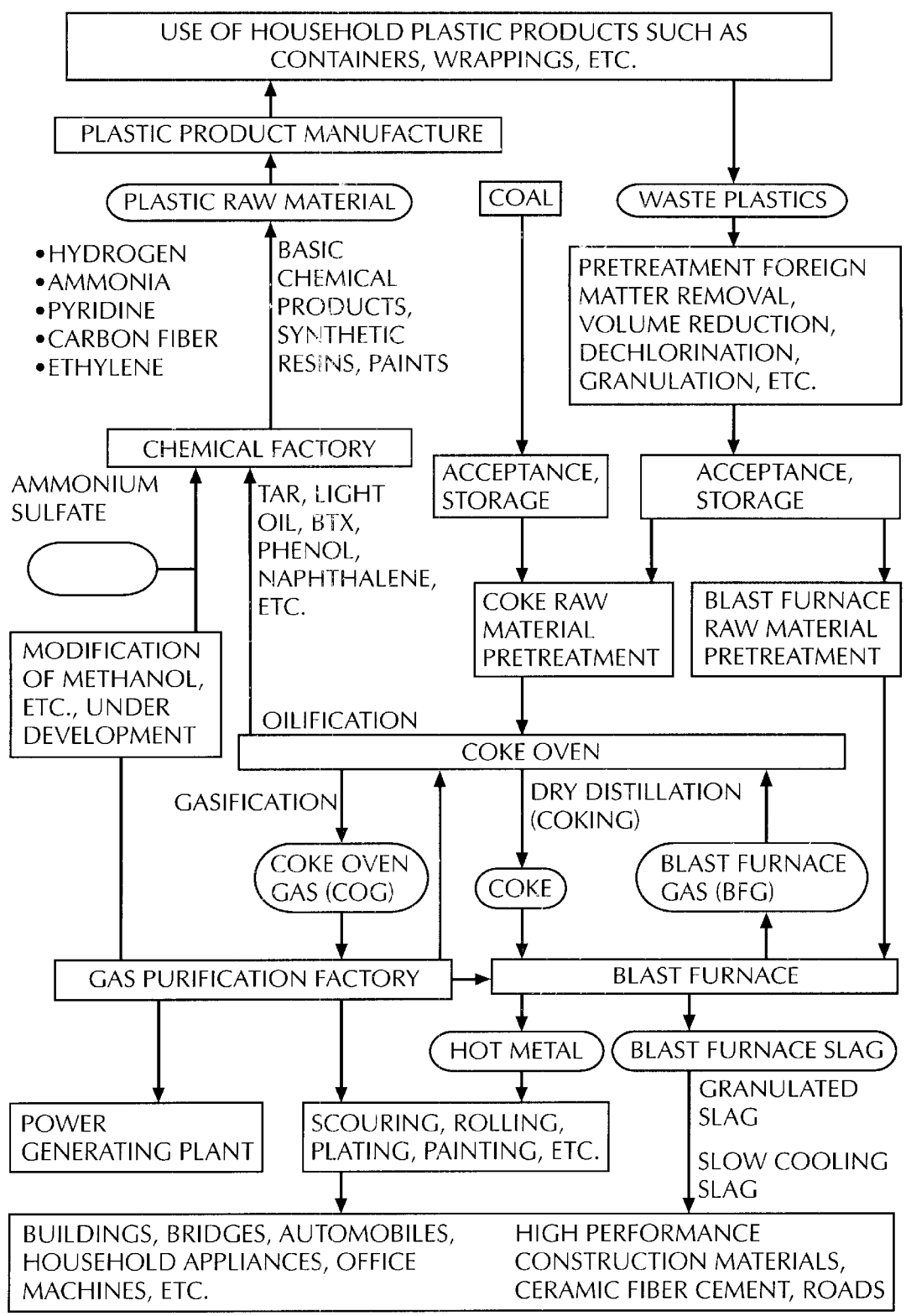
FIG. 2 is an illustration showing material flow during operation of a waste plastic pig-iron process (blast furnace, coke oven).

As shown in FIG. 2, plastic products such as containers and wrappings are used in households, and the generated waste plastics are accepted after undergoing prior treatment such as removal of foreign matter, volume reduction processing, dechlorination, granulation, etc., and a portion of the stored stock is treated in a blast furnace according to the invention after undergoing blast furnace raw material pretreatment. The hot metal produced by the blast furnace is subjected to treatment such as scouring, rolling, plating, painting, etc. and then supplied for use in buildings, bridges, household appliances, office machines and the like. The blast furnace slag generated by the blast furnace is used as granulated slag or slow cooling slag for high performance building materials, ceramic fibers, cement, roads and the like. The blast furnace gas (BFG) is used in the coke oven. A portion of the pretreated waste plastics is subjected to coke raw material pretreatment in the same manner as the coal received in storage, and dry distillation (coking) treatment is carried out in the coke oven to produce coke. The coke is then used in the blast furnace The tar, light oil, BTX, phenol, naphthalene, etc. generated and converted to oil in the coke oven is utilized at chemical factories for hydrogen, ammonia, carbon fibers, ethylene and other basic chemical goods, and synthetic resins, paints, and the like, and is used in production from plastic raw materials to plastic articles, for circulating use as plastic products in households and elsewhere. The coke oven gas (COG) as a gas product from the coke oven is passed through a gas refinery and used at power generating plants and for pig iron refining, while modification to methanol or the like will allow its reuse for production of ammonium sulfate and hydrogen, ammonia, carbon fibers, ethylene, etc. at chemical factories.

A process for treatment of waste plastics as reducing agents in a blast furnace will be explained first. Industrial waste plastics are constitutionally distinguished as those including and not including chlorine-based plastics or foreign matter, and these are collected by separate disposal enterprises. The sizes and shapes may be selected for collection depending on the capacity of the accepting facility.

In the case of general waste plastics consisting of plastic garbage and incombustible garbage that are separated for disposal by households, a preliminary collection is made by the local governing body. The material collected at the stockyard of the local governing body is transported to the treatment facility of a private company whose workers are entrusted with recycling of plastic garbage. Distinction depending on the types of plastic materials and foreign matter is not possible at this point in the collection process.

The industrial waste plastic and general waste plastic that has been transported to the private treatment facility is then subjected to pretreatment to convert it to a convenient form for loading into a blast furnace.

In the case of industrial waste plastics consisting of solid waste plastics containing no chlorine, it is subjected to pulverization/foreign matter removal/fine pulverization (to under about 10 mm) and then granulated for blast furnace use. When it contains chlorine, it is separated into high chlorine-containing plastics and low chlorine-containing plastics by separation with a gravity separator utilizing the difference in specific gravities after fine pulverization. (1 or greater for chlorine-containing plastics, less than 1 for PE, PP, PS, etc. containing no chlorine.) Once separation has achieved a chlorine content of under 0.5 wt % for the low chlorine-containing plastics, these are granulated for use in the blast furnace. Meanwhile, the high chlorine-containing plastics that have hitherto been designated for land-fill disposal are granulated to 10–70 mm and treated in a coke oven, thereby allowing recycling of close to 100% of the foreign matter-removed waste plastics, without affecting the yield of the gravity separator.

In the case of general waste plastics, the foreign matter content will differ considerably depending on the mode of collection by each region, but the composition of typical separated plastic comprises 75% combustible material which is mostly plastic (of which chlorine constitutes 5–10%), 5% magnetic metal, 2% aluminum, 8% glass and other inorganic substances (of which 5% is the inorganic portion in the combustible material) and 10% water. This must be passed through steps of bag tearing, magnetic separation, foreign matter removal, fine pulverization, gravity separation, dehydration, drying and granulation in order to reach the granulating specifications for blast furnace reducing agents which require a chlorine content of less than 0.5 wt % and an ash content of less than 5%. Although it will depend on the particular performance of the gravity separator, about 50–70 wt % of the finely pulverized plastics (having an amorphous shape of about 10–20 mm) that have been loaded into the gravity separator will be separated as blast furnace reducing agent-suitable plastics (chlorine content: <0.5%).

Dechlorination that gives a chlorine content of under 0.5 wt % for waste plastics blown in from the tuyere of a blast furnace without using gravity separation can be accomplished by a well-known process of heating to about 300° C. in a resin double kneader (for example, Japanese unexamined Patent Publication HEI No. 8-120285).

Because of possible problems of corrosion of the furnace and exhaust system by hydrogen chloride when the chlorine input from the raw fuel increases in the blast furnace, and consequent inhibition of the furnace reaction, it is necessary to limit the increased chlorine inclusion from the treated waste plastics to about 50 g per ton of hot metal, and therefore the gravity separation and dechlorination described above are carried out; however, when approximately 1.7 kg of waste plastics are blown in per ton of hot metal (10/6) in a blast furnace, the chlorine falls to about 3% due to sorting after collection, and therefore dechlorination treatment is not always necessary.

The waste plastics are blown in through the tuyere of the blast furnace because of reasons such as the high temperature of the furnace top. The volume of waste plastics blown in through the tuyere, like the pulverized coal injection, is determined from the standpoint of avoiding permeability reduction in the furnace due to unburnt components, and by the density and particle size of the waste plastics and the air flow volume and speed from the hot air oven. These blow-in volumes and forms of blown-in waste plastics have long been well-known to those skilled in the art and are also disclosed by various patents, and therefore a detailed explanation will not be provided here. (See, for example, Japanese Patent Public Inspection HEI No. C-507105, Japanese Unexamined Patent Publication HEI No. 9-170009, HEI No. 9-137926, HEI No. 9-125113).

The maximum volume for loading into the blast furnace may be up to at most 10 kg of loaded waste plastics per ton of hot metal, ignoring the chlorine content. If this volume is exceeded the blast furnace core may become inactivated, resulting in inhibited blast furnace productivity. On the other hand, if the loading volume is less than 0.5 kg there will be no point to the recycling. When 10 kg of waste plastics containing 0.5 wt % chlorine are blown in through the tuyere of the blast furnace per ton of hot metal, the chlorine input is 50 g per ton of hot metal. Since the chlorine concentration brought into the blast furnace from the blast furnace raw material during normal operation is 300–350 g per ton of hot metal, the chlorine input ratio carried in from the waste plastics increases by 20%. This is within an acceptable range for practical operation, and is therefore set as the maximum chlorine input carried into the blast furnace. Managing the chlorine input carried into the blast furnace can ensure that the chlorine concentration of the waste plastics for the blast furnace is acceptable up to a few percent, depending on the loading volume.

Waste plastics with a high chlorine content that have been separated and excluded for blast furnace use, or waste plastics that have not been thoroughly treated in the blast furnace, may be subjected to high-temperature decomposition in a thermal decomposition treatment furnace for gasification, such as a partial oxidation furnace or dry distillation oven, provided with the blast furnace. Any type of furnace may be employed so long as the atmosphere is reducing and the temperature is at least 400° C. which allows gasification of the waste plastics, and for example, a CDQ (installation for recovering the cooling heat of the coke) may be employed.

The high-temperature gas produced by thermal decomposition of the waste plastics is first removed by washing of the chlorine-based gas components by alkali washing or the like, and then the decomposition gas may be used industrially as chemical industrial raw material or high-calorie gas.

Thermal decomposition treatment of chlorine-containing waste plastics gives a carbon/ash residue and chlorine-containing hydrocarbon gases. The carbon/ash residue is used as coke for a reducing agent in the blast furnace, and the chlorine component-removed hydrocarbon gases are utilized as coke oven gases and as raw materials for chemical products, as well as for an high-efficiency iron factory energy source. The combination treatment of the thermal decomposition treated waste plastics in the blast furnace and coke oven can achieve very high recycling efficiency for products.

The gas generated during thermal decomposition when waste plastics are loaded into the thermal decomposition furnace inevitably contains chlorine-based gas. One process for rendering this harmless can be accomplished by mounting an apparatus for atomizing ammonia water to the chlorine-based gas via the exhaust gas channel. In steel manufacturing processes, ammonia liquor is generated in the coke oven and can be used as an alkali washing source for the chlorine-containing high-temperature hydrocarbon gas. Ammonia liquor is water that absorbs ammonia generated from coal in the coking process, cools the high-temperature (approximately 900° C.) coke gas (to under 80° C.), and is spray circulated for the purpose of purification. When a thermal decomposition treatment furnace is provided with the coke oven and the exhaust gas from the thermal decomposition treatment furnace is connected to the ascension pipe of the coke oven, the high-temperature hydrocarbon gas containing chlorine-based gas is contacted with ammonia, whereby the chlorine-based gas is fixed as ammonium chloride. The ammonia yield per ton of raw carbon is 3000–4000 g, and for example, in the case of treating 10 kg of waste plastics with a 5% chlorine content per ton of coal, which corresponds to a chlorine input of 500 g, the ammonia generated from coal has more than a six-fold neutralizing capacity.

A coke oven is the ideal type of furnace for thermal decomposition of waste plastics. The collection of waste plastics to be treated in a coke oven is the same as for treatment of waste plastics in a blast furnace, and will not be explained here. Heavy waste plastics (with a chlorine content of 7–30 wt %) separated by gravity separation or waste plastics that could not be thoroughly treated in the blast furnace are subjected to dry distillation treatment in the coke oven.

For loading of the waste plastics into the coke oven, it is necessary to separate and remove the metals as foreign matter. The collected waste plastics are passed through a process of crude pulverization (bag tearing), magnetic separation, foreign matter removal (non-magnetic substances) and volume reduction, giving an ash content of 10% or lower, a chlorine content of 30% or lower, a granularity of 10–70 mm, a net calorific value of 5000 kcal/kg or greater and a heavy metal content of 1% or lower. The high chlorine-containing heavy plastics other than those to be used as reduction agents in the blast furnace are subjected to ash and heavy metal removal through an added washing function and are granulated, thus satisfying the aforementioned granulating specifications for coke. By this combination of a blast furnace process and coke process, waste plastics can be recycled at an efficiency of near 100%.

When the waste plastics are loaded into the coke oven, the bulk plastic is pulverized to a prescribed granularity for loading as the raw material. However, since waste plastics are originally collected in the form of films, foam bodies and powders, simple pulverization thereof to the prescribed granularity gives a bulky loading raw material with a low bulk density, and when excessive powder is included it may not easily mix with the coal of the coke raw material, and loading may therefore be hampered. In addition, bulky plastics with a low bulk density are very difficult to handle since there is a risk of ignition in the vicinity of the high-temperature coke oven. The chlorine-containing plastics are therefore preheated to a temperature of 80–190° C. and compressed in this state, and then recooled for volume reduction and solidification. The size of the volume-reduced solids may be appropriately designed depending on the transportability and miscibility with the coal, and on the coke strength and ignition risk during dry distillation with the coal, but it will generally be a diameter of about 5–10 mm. The method employed for volume reduction and solidification may be a conventional one using a resin kneader, pulverizer, drum-type heater or the like.

As concerns the loading position for the waste plastics into the coke oven, there may be mentioned a method of addition into the space at the top (for example, Japanese unexamined Patent Publication HEI No. 9-157834), a method of addition to the bottom of the carbonization chamber (for example, Japanese Unexamined Patent Publication HEI No. 9-132782) and a method of premixing with the coal (for example, Japanese unexamined Patent Publication HEI No. 6-228565). When waste plastics are charged in a specific carbonization chamber, there may be employed a method of transport to the coke oven top by stream transport with an inert gas, followed by dumping into the specific carbonization chamber together with the inert gas through a storage hopper provided with a quantitative cutoff function. For the loading, the procedure is preferably carried out in a condition isolated from the atmosphere in order to avoid problems such as blowout of the thermal decomposition gas and induction of the atmospheric air, and specifically the method proposed by the present applicant in Japanese Unexamined Patent Publication HEI No. 4-41588 may be employed. The present invention is effective for any loading apparatus, loading position and loading method.

For treatment in the coke oven, a portion of the multiple carbonization chambers of the coke oven may be used exclusively for recycling of waste plastics, in which case the treatable volume in the coke oven can be increased to further augment treatment capacity, thus making it possible to augment treatment capacity while eliminating prior dechlorination of waste plastics treated in the blast furnace. A specific method is one in which a few carbonization chambers of a coke oven constructed with over 100 chambers are dedicated to heat treatment of waste plastics, and ammonia liquor being circulated in the coke oven is used for flushing into the coke oven gas that contains generated chlorine gas, thus rendering harmless the chlorine contained in the coke oven gas. This method is possible because a coke oven employs the flushing ammonia liquor in all of the carbonization chambers. Unlike the case where chlorine-containing plastics are dry distilled together with coal, this method has no restriction on the volume of chlorine-containing plastics loaded into the carbonization chamber, while the coal as an ammonia source is not essential and the temperature of the carbonization chamber may be appropriately designed in a range of 400–1300° C.

When the waste plastics are thermally decomposed in some of the carbonization chambers of a coke oven with multiple carbonization chambers and the coke is dry distilled in the other carbonization chambers, there is no risk of quality reduction of the coke.

A coke oven is an installation for dry distillation of coal, and the ammonia required to render harmless the chlorine-based gas from the waste plastics is generated from the coal. This ammonia undergoes flushing by water in the ascension pipe, being cooled to ammonia water (ammonia liquor). The ammonia liquor is recirculated for use in the ascension pipe of all of the carbonization chambers.

The flushing method may be one that has been conventionally used in coke ovens. The temperature of the gas in the oven top space is around 800° C., and the generated hydrogen chloride gas and ammonia gas pass through this oven top space and are directed toward a bend through an ascension pipe provided above the carbonization chamber. The gas temperature in the ascension pipe is about 700° C. Cast iron is generally used as the material for the ascension pipe, but in some cases this design may be modified in consideration of corrosion of the conduit materials up to the dry main where the ammonia gas undergoes water spraying (flushing). The chlorine-based gas produced as a result of thermal decomposition of the waste plastics is rendered harmless by being fixed as ammonium chloride by the flushing with ammonia liquor.

Most coal can be categorized as caking coal that is suitable for blast furnace coke manufacture and non-caking coal that is not suitable therefor, and in the actual coke oven operation, caking coal and non-caking coal are mixed in a desired proportion and used as blended coal to obtain a prescribed coke quality. Here, the non-caking coal is usually coal with a maximum fluidity index of no greater than 10 ddpm by the Gieseler plastometer method specified by JIS M8801, or a vitrinite average reflectance of no higher than 0.8. As a result of studying the relationship between waste plastic mixing proportions and coke quality when waste plastics are loaded into a coke oven chamber together with coal, it was found that coke quality can be maintained even with waste plastics included at up to 1 wt %. When the amount of plastic-including raw material is added at greater than 1 wt %, the mixing proportion of non-caking coal can be reduced in an amount corresponding to the reduction in coke strength and the mixing proportion of caking coal accordingly increased, to thereby adequately compensate for the coke strength.

When coal is dry distilled in a coke oven, the temperature often reaches a maximum of 1300° C. On the other hand, polyvinyl chloride and polyvinylidene chloride begin to thermally decompose from about 250° C., gasifying at about 400° C. and completely degrading at 1300° C. Consequently, so long as chlorine-containing plastics are thermally decomposed or dry distilled together with the coal in the coke oven, the heating pattern and the heat treatment temperature for the thermal decomposition or dry distillation may be the same as for conventional coal dry distillation.

As concerns the method for distributing the waste plastics to the blast furnace and the coke oven, basically the volume that is treated in the coke oven may be the volume above the treatable volume in the blast furnace which is determined by the effect on quality, the effect of the chlorine and the blow-in limit. Here, it is preferred to divide the separated and collected waste plastics into a portion with a low chlorine content for the blast furnace, and the remaining portion. The method used may be a gravity separation method or a manual sorting method.

The gravity separation method is a separation method that takes advantage of the fact that chlorine-containing resins such as vinyl chloride and chlorine-containing organic substances have particularly high specific gravity among waste plastics. While the specific gravity of most plastics such as polyethylene and polypropylene is 0.90–0.97, the specific gravity of vinyl chloride is as large as 1.16–1.56, while even ABS resins and PET resins are larger than 1. Consequently, after waste plastics containing vinyl chloride have been finely pulverized, they may be subjected to gravity separation using water, for example. That is, the waste plastics with a specific gravity of greater than 1 are allowed to settle using a precipitating separator, and the waste plastics with a specific gravity of 1 or lower are discharged out with the water. The waste plastics discharged out with the water are supplied to a wire net ramp to separate the water and the waste plastics. The obtained waste plastics with a specific gravity of greater than 1 contain abundant chlorine-containing resins such as vinyl chloride and chlorine-containing organic compounds, while the waste plastics with a specific gravity of 1 or lower contain virtually no vinyl chloride, and have a chlorine content of less than 0.5 wt %. A typical gravity separation method employs a rotating drum-type centrifugal gravity separator, and commercially available apparatuses can be obtained by purchase. The gravity separation method may also be air classification.

When the treatment volume is not large, the chlorine-containing resin or chlorine-containing organic compounds can be separated and removed relatively easily by hand sorting. This somewhat limits the uses of the chlorine-containing resins such as vinyl chloride to those that can be readily distinguished by humans based on color or shape.

The chlorine content of the waste plastics can be measured by the following method. A 10 kg portion of waste plastics that have been pulverized to about 10–20 mm is dispensed at a final allotment of 20 g/lot by repeated fractional sampling, to prepare a representative sample. The sample is cooled and pulverized into a powder. The powder may be subjected to fluorescent X-ray analysis as a qualitative analysis method to obtain a result on the percent level. The chlorides obtained by the Cl content testing method described under "Crude Oil and Petroleum Product Sulfur Testing Method" of JIS-K-2541 as the qualitative analysis method are subjected to ion chromatography to measure the Cl ion content, and this is given in terms of total Cl. The results are used to obtain the average value for the chlorine content.

The following method may be used to obtain waste plastics having a chlorine content of less than 0.5 wt % by gravity separation. Fine pulverized waste plastics (about 10–20 mm) from which the foreign matter have been removed are provided, with water, to a rotating drum-type centrifugal gravity separator. The drum is rotated at 2000–3000 rpm and the pulverized plastics are separated into a floating portion (light substances) and settling portion (heavy substances) in a specific gravity solution by an acceleration of 1000–1700 G (on the separated water surface). When supplied, 50–70% of the light substances are collected from waste plastics with a 5–10% chlorine concentration, and the chlorine concentration of the light substances becomes 0.3–0.5 wt %. This is accomplished because chlorine-based resins have a specific gravity of about 0.1–0.2 higher than that of polyethylene, polypropylene or polystyrene foam, and are separated as the settled portion.

The ammonia liquor taken out of the system from the coke oven and thermal decomposition furnace contains a large amount of accumulated ammonium chloride resulting from reaction between the chlorine-based gas derived from the waste plastics and ammonia, and a strong base such as sodium hydroxide (caustic soda) is preferably added thereto. The strong base may be potassium hydroxide instead of sodium hydroxide. The ammonium chloride in the ammonia liquor will therefore react with the sodium hydroxide to form sodium chloride and ammonia. The amount of sodium hydroxide added is preferably the same or a slightly larger amount than the ammonium chloride.

In the past, ammonia removal equipment has been provided in coke ovens to treat ammonia liquor discharged out of the system. Such ammonia removal equipment vaporizes and removes free ammonia by vapor stripping and then conducts an activated sludge treatment for efflux. According to the present invention, the ammonium chloride in the ammonia liquor is converted to sodium chloride and ammonia by sodium hydroxide before entering the ammonia removal equipment, and therefore all of the nitrogen components contained in the ammonia liquor are in the form of ammonia. Consequently, the nitrogen components in the ammonia liquor are removed as a result of vaporization removal of ammonia in the ammonia removal equipment. Since only harmless sodium chloride remains in the ammonia liquor that has left the ammonia removal equipment, direct efflux does not risk increasing the nitrogen content of seawater.

EXAMPLES

Typical general waste separated plastics collected in garbage bags [composition: 75% combustible material (5–10% chlorine content), 5% magnetic metal, 2% aluminum, 8% glass and other inorganic substances (5% inorganic substances in combustible material), 10% moisture] was passed through the steps of bag tearing, magnetic separation, air classification & vibration sifting, fine pulverization, wet gravity separation, draining/drying and granulation for use as a blast furnace reducing agent, to obtain a product with a granularity of 1–10 mm, a density of at least 0.3 kg/l, an ash content of under 10% and a chlorine content of under 0.5%. The raw material yield was calculated to be approximately 50–60%.

This was not a satisfactory level from the standpoint of recycling. Next, the high-chlorine plastics that settled at a 20–30% yield as heavy plastics (high-chlorine plastics) by wet gravity separation were subjected to dechlorination treatment by thermal decomposition treatment instead of waste disposal, for use as a blast furnace reducing agent. This gave an improved raw material yield but resulted in higher cost.

The waste plastics containing vinyl chloride were separated by gravity separation or manual sorting into waste plastics with a high vinyl chloride content and waste plastics with a low vinyl chloride content, and the waste plastics with a high vinyl chloride content were loaded into a coke oven for thermal decomposition treatment, while the waste plastics with a low vinyl chloride content were blown into a blast furnace through the tuyere; these examples are shown in Table 1. The production of the blast furnace was 10,000 tons per day.

For the operation evaluation of the coke oven, ○ was used to indicate cases in which the coke strength of the output from the carbonization chamber after dry distillation was at least 84 in terms of the coke drum strength according to JIS K2151 (150 rotations+15 mm), the chlorine content of the light oil was under 10 ppm, the proportion of chlorine captured by flushing was at least 90% and the nitrogen concentration was less than 20 mg/l in the waste water from which nitrogen was removed through vapor stripping by addition of caustic soda, while "X" was designated to indicate cases where any one of these was inadequate. For the operation evaluation of the blast furnace, "○" was used to indicate favorable operation where the projected production of pig iron tapping volume was obtained without problems such as furnace top pressure variation or shaft pressure variation.

When the operation in Example 5 was continued for about one month, approximately 7000 tons of waste plastics were successfully treated.

Industrial Applicability

By using both a blast furnace and a coke oven and accomplishing thermal decomposition of chlorine-containing waste plastics in the coke oven, it has become possible to eliminate the dechlorination step for the chlorine-containing waste plastics or recycle large volumes of even chlorine-containing waste plastics, which would otherwise be destined for disposal.

What is claimed is:

1. A process for treating resins containing chlorine or organic compounds containing chlorine, or waste plastics containing them, characterized by treating a portion of resins or organic compounds, or waste plastics containing them as reducing agents in a blast furnace, subjecting all or a portion of a remainder to thermal decomposition treatment in a coke oven and contacting a gas generated by the thermal decomposition treatment with ammonia water which is generated during distillation of coal.

2. A process for treating resins containing chlorine or organic compounds containing chlorine, or waste plastics containing them, according to claim 1, characterized by separating resins or organic compounds or waste plastics containing them into a high chlorine content portion and a low chlorine content portion, treating the low chlorine content portion in the blast furnace and subjecting the high chlorine content portion to thermal decomposition treatment in the coke oven.

3. A process for treating resins or organic compounds, or waste plastics containing them according to claim 2, characterized by separating resins, organic compounds or waste plastics containing them into a high chlorine content portion and a low chlorine content portion by gravity separation.

4. A process for treating resins containing chlorine or organic compounds containing chlorine or waste plastics containing them, according to claim 1, characterized by separating resins or organic compounds, or waste plastics containing them into a portion with an average chlorine content of 0.5 wt % or greater and a portion with an average chlorine content of less than 0.5 wt %, treating the portion with an average chlorine content of less than 0.5 wt % in the blast furnace and subjecting the portion with an average chlorine content of 0.5 wt % or greater to thermal decomposition treatment in the coke oven.

5. A process for treating resins containing chlorine or organic compounds containing chlorine, or waste plastics

TABLE 1

| | | Waste plastic chlorine content (%) | | | Coke oven | | Blast furnace | |
| | | | After separation | | Wast plastic | | Waste plastic | |
| | Separation method | Before separation | High vinyl chloride | Low vinyl chloride | loading volume (%) | Operation evaluation | loading volume (%) | Operation evaluation |
|---|---|---|---|---|---|---|---|---|
| 1 | manual | 1.6 | 3.5 | 0.1 | 0.5 | ○ | 2.0 | ○ |
| 2 | manual | 2.3 | 3.0 | 0.1 | 1.0 | ○ | 1.0 | ○ |
| 3 | gravity | 1.0 | 2.4 | 0.3 | 2.0 | ○ | 3.0 | ○ |
| 4 | gravity | 1.5 | 2.5 | 0.3 | 2.0 | ○ | 5.0 | ○ |
| 5 | gravity | 1.5 | 2.2 | 0.3 | 3.0 | ○ | 5.0 | ○ | containing them, according to claim 1, characterized by treating a portion of resins or organic compounds, or waste plastics containing them as reducing agents in the blast furnace after prior dechlorination treatment, and subjecting all or a portion of the remainder to thermal decomposition treatment in the coke oven without prior dechlorination treatment.

6. A process for treating resins or organic compounds or waste plastics containing them according to claim 5, characterized by treating a portion of resins or organic compounds, or waste plastics containing them as reducing agents in a blast furnace after prior dechlorination treatment to a chlorine content of less than 0.5 wt %.

7. A process for treating resins or organic compounds, or waste plastics containing them according to claim 6, characterized in that the portion of resins or organic compounds, or waste plastics containing them that has been subjected to prior dechlorination treatment to a chlorine content of less than 0.5 wt % is treated in the blast furnace in an amount of 0.5–10 kg per ton of hot metal.

8. A process for treating resins containing chlorine or organic compounds containing chlorine, or waste plastics containing them, according to claim 1, characterized by treating a portion of resins or organic compounds, or waste plastics containing them as reducing agents in the blast furnace without prior removal of the chlorine components, and subjecting all or a portion of the remainder to thermal decomposition treatment in the coke oven without prior removal of the chlorine components.

9. A process for treating resins or organic compounds, or waste plastics containing them according to claim 8, characterized in that the resins or organic compounds, or waste plastics containing them are treated as reducing agents in the blast furnace without prior removal of the chlorine components, at a minimum of 0.5 kg per ton of hot metal and a maximum of a blast furnace treatment volume that reflects the chlorine allowable limit.

10. A process for treating resins or organic compounds, or waste plastics containing them according to claim 9, characterized in that at least 0.5 kg and no more than 1.7 kg of the resins or organic compounds, or waste plastics containing them is treated in the blast furnace per ton of hot metal without prior removal of the chlorine components.

* * * * *